United States Patent [19]

Ogawa et al.

[11] Patent Number: 4,959,897
[45] Date of Patent: Oct. 2, 1990

[54] TORSION SPRING MOUNTING APPARATUS

[75] Inventors: Masazumi Ogawa; Kenichi Watanabe; Tsutomu Yamazaki, all of Kanagawa, Japan

[73] Assignee: Fuji Photo Film Co., Ltd., Kanagawa, Japan

[21] Appl. No.: 379,133

[22] Filed: Jul. 13, 1989

[30] Foreign Application Priority Data

Jul. 21, 1988 [JP]  Japan ............................... 63-182599

[51] Int. Cl.$^5$ ........................................... B23P 19/04
[52] U.S. Cl. ..................................................... 29/227
[58] Field of Search .................. 140/89; 29/225, 227, 29/226, 446, 700; 267/137, 155

[56] References Cited

U.S. PATENT DOCUMENTS 4,509,240  4/1985  Tezuka .................................. 29/227
4,653,185  3/1987  Kajima et al. ....................... 29/227

Primary Examiner—Robert C. Watson
Attorney, Agent, or Firm—Sughrue, Mion, Zinn, Macpeak & Seas

[57] ABSTRACT

A torsion spring mounting apparatus mounts a torsion spring on a spring support. The torsion spring comprises a leg portion, a coiled portion one end part of which extends to the leg portion, and an engagement portion which extends to the other end part of the coiled portion and which is bent in the radial direction of the coiled portion. The spring support comprises a cylindrical shaft onto which the coiled portion is to be fitted, and a coil engaging protrusion embedded in the circumferential surface of the shaft such that the coil engaging protrusion is normal to the shaft. A spring movement device grasps the torsion spring, and fits the coiled portion onto the shaft by moving the torsion spring along the shaft so that the engagement portion does not overlap the coil engaging protrusion. A push device pushes the leg portion of the torsion spring, which has been fitted onto the shaft, in order to cause the torsion spring to rotate along the circumferential direction of the shaft and make the engagement portion engage with the coil engaging protrusion.

4 Claims, 5 Drawing Sheets

TORSION SPRING MOUNTING APPARATUS

BACKGROUND OF THE INVENTION

1. Field of the Invention

This invention relates to an apparatus for mounting a torsion spring on a spring support. This invention particularly relates to a torsion spring mounting apparatus which effects the reliable engagement of a torsion spring with its support.

2. Description of the Prior Art

Torsion springs are widely used as urging means in various types of apparatuses. For example, torsion springs are used as urging means for guard panels in video tape cassettes. The torsion spring is mounted on a spring support with a coiled portion of the torsion spring being fitted onto a cylindrical shaft of the spring support.

FIG. 4 is a perspective view showing a conventional torsion spring mounting apparatus. With reference to FIG. 4, a torsion spring 1 is mounted on a supporting means 3 of a guard panel 2 which serves as a spring support. An edge of the guard panel 2 is supported on a fixture 5, and the guard panel 2 is positioned on a base plate 6. The supporting means 3 comprises a cylindrical shaft 3A, and a coil engaging protrusion 3B embedded in the circumferential surface of the shaft 3A such that the coil engaging protrusion 3B is normal to the shaft 3A. On the other hand, the torsion spring 1 comprises an approximately linear leg portion 1A, a coiled portion 1B, one end part of which extends to the leg portion 1A, and an engagement portion 1C which extends to the other end part of the coiled portion 1B in the radial direction of the coiled portion 1B. A single torsion spring 1 is fed from a torsion spring feed means (not shown), grasped by claws 7A and 7B of a spring movement means 8, and then fitted onto the supporting means 3. Specifically, after grasping the coiled portion 1B of the torsion spring 1 as illustrated, the spring movement means 8 adjusts the position of the coiled portion 1B so that the center axis of the coiled portion 1B coincides with the center axis of the shaft 3A. Thereafter, the spring movement means 8 moves the torsion spring 1 in the direction indicated by the arrow A along the center axis of the shaft 3A, and fits the coiled portion 1B onto the shaft 3A. At this time, the engagement portion 1C of the torsion spring 1 is positioned in such a way that it does not overlap the coil engaging protrusion 3B of the supporting means 3 in the direction along which the torsion spring 1 is moved.

FIGS. 5A and 5B are perspective views showing how the torsion spring 1 is made to engage the supporting means 3 with the help of gravity. As shown in FIG. 5A, the torsion spring 1 is moved by the spring movement means 8 until the coil engaging protrusion 3B is located between the engagement portion 1C and the coiled portion 1B. Thereafter, the spring movement means 8 moves the claws 7A and 7B away from each other and is retracted upwardly. The center of gravity of the torsion spring 1 is closer to the leg portion 1A than the center point of the coiled portion 1B. Therefore, when the torsion spring 1 is released from the claws 7A and 7B after it is in the position illustrated in FIG. 5A, it is rotated in the direction indicated by the arrow B around the shaft 3A under the force of gravity. As shown in FIG. 5B, as the torsion spring 1 is thus rotated, the engagement portion 1C falls down and engages with the coil engaging protrusion 3B. Thereafter, the guard panel 2 is sent to the next process together with the fixture 5.

As described above, with the conventional technique, after the torsion spring 1 is fitted onto the shaft 3A, engagement between the engagement portion 1C and the coil engaging protrusion 3B is effected by the force of gravity on the leg portion 1A. However, in cases where the torsion spring 1 is mounted quickly, engagement failures readily arise. Also, in cases where the shape of the torsion spring 1 is changed so that the center of gravity of the torsion spring 1 shifts toward the center point of the coiled portion 1B, the engagement portion 1C cannot reliably be made to engage with the coil engaging protrusion 3B.

SUMMARY OF THE INVENTION

The primary object of the present invention is to provide a torsion spring mounting apparatus which makes an engagement portion of a torsion spring reliably engage with a coil engaging protrusion of a spring support although the shape of the torsion spring may vary.

Another object of the present invention is to provide a torsion spring mounting apparatus which quickly and reliably mounts a torsion spring on a spring support.

The present invention provides a torsion spring mounting apparatus for mounting a torsion spring on a spring support, said torsion spring comprising a leg portion, a coiled portion, one end part of which extends to the leg portion, and an engagement portion which extends to the other end part of the coiled portion and is bent in the radial direction of the coiled portion, said spring support comprising a cylindrical shaft onto which the coiled portion is to be fitted, and a coil engaging protrusion embedded in the circumferential surface of the shaft such that the coil engaging protrusion is normal to the shaft, wherein the improvement comprises the provision of:

(i) a spring movement means which grasps said torsion spring, and fits said coiled portion onto said shaft by moving said torsion spring along said shaft so that said engagement portion does not overlap said coil engaging protrusion, and (ii) a push means which pushes said leg portion of said torsion spring, which has been fitted onto said shaft, in order to rotate said torsion spring along the circumferential direction of said shaft and to make said engagement portion engage with said coil engaging protrusion.

With the torsion spring mounting apparatus in accordance with the present invention, because the leg portion of the torsion spring is pushed by the push means, the torsion spring can be made to engage with the spring support quickly and reliably. Therefore, the speed with which the torsion spring is mounted can be increased. Also, the torsion spring can be mounted reliably although the shape of the torsion spring may be changed in such a way that the center of gravity of the torsion spring shifts from the leg portion toward the center point of the coiled portion.

BRIEF OF THE DRAWINGS OF THE DRAWINGS

FIG. 1 is a perspective view showing an embodiment of the torsion spring mounting apparatus in accordance with the FIGS. 2A, 2B and 2C are schematic views showing how a push piece operates, FIG. 3 is a perspective view showing another embodiment of the torsion spring mounting apparatus in accordance with the invention, FIG. 4 is a perspective view showing a conventional torsion spring mounting apparatus, and FIGS. 5A 5B, are perspective views showing how gravity forces a torsion spring to engage with a supporting means.

DESCRIPTION OF THE PREFERRED EMBODIMENTS

The present invention will hereinbelow be described in further detail with reference to the accompanying drawings.

Figure 1:
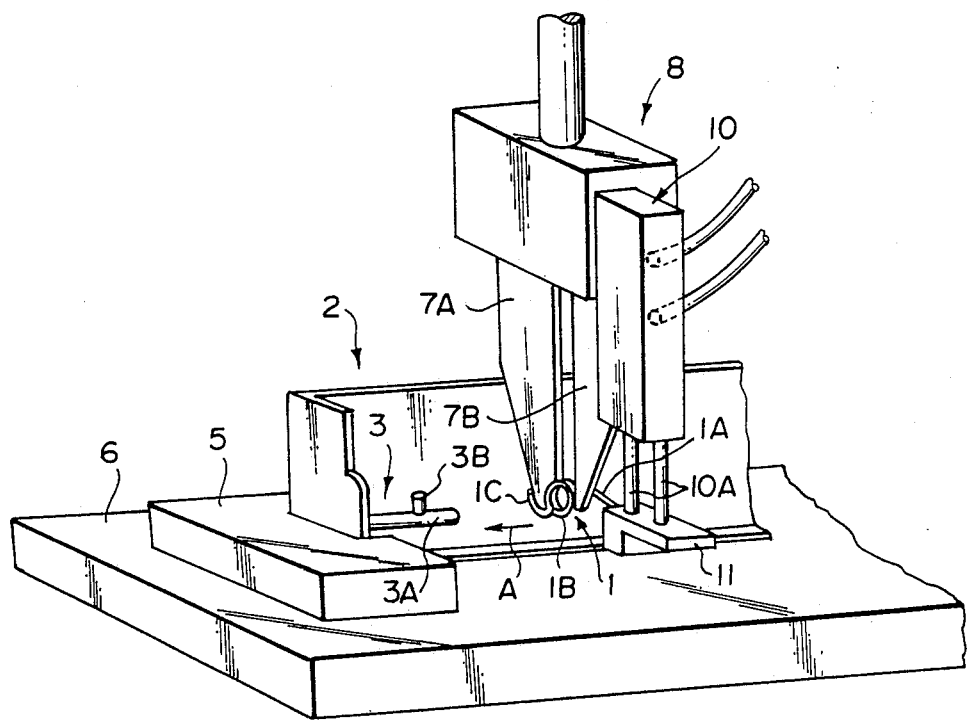
Figure 4:
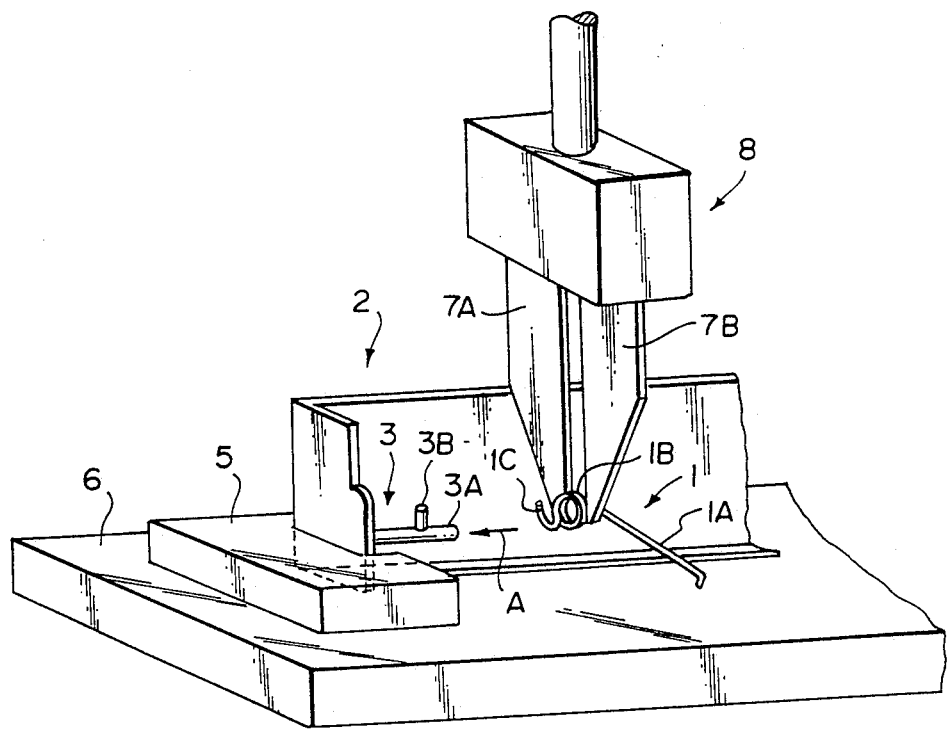
Figure 5A:
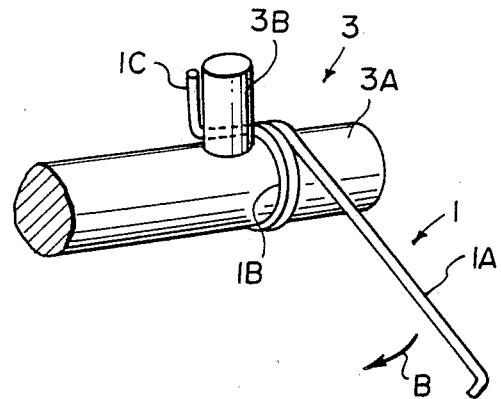
Figure 5B:
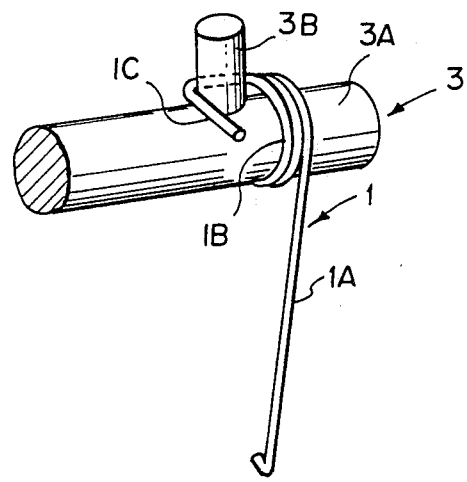

In FIG. 1, similar elements are numbered with the same reference numerals with respect to FIG. 4.

With reference to FIG. 1, a spring movement means 8 grasps a torsion spring 1 and fits it onto a supporting means 3 of a guard panel 2. An air cylinder 10 having vertically moveable rods 10A, 10A is secured to the spring movement means 8. A push piece 11 is secured to the lower edges of the rods 10A, 10A. In this embodiment, the air cylinder 10 and the push piece 11 constitute a push means.

Figure 2A:
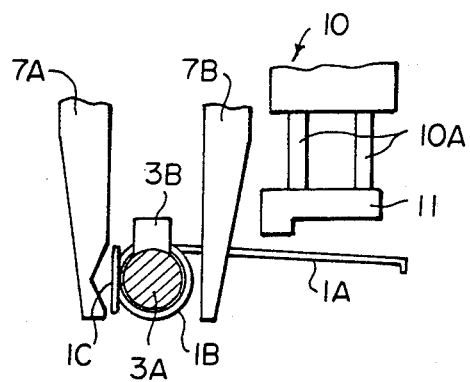

The torsion spring 1 is grasped by claws 7A and 7B of the spring movement means 8 as illustrated, and is moved in the direction indicated by the arrow A such that an engagement portion 1C of the torsion spring 1 does not overlap a coil engaging protrusion 3B of the supporting means 3. In this manner, a coiled portion 1B is fitted onto a shaft 3A of the supporting means 3. After the coiled portion 1B has been fitted onto the shaft 3A, the coil engaging protrusion 3B is located between the engagement portion 1C and the coiled portion 1B in the direction along which the torsion spring 1 is moved. FIG. 2A illustrates a step in which the claws 7A and 7B release the coiled portion 1B after the coiled portion 1B has been fitted onto the shaft 3A.

Figure 2B:
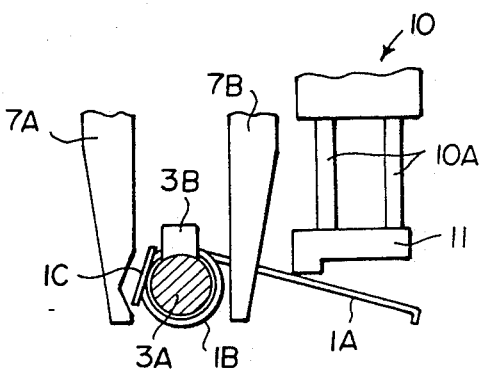
Figure 2C:
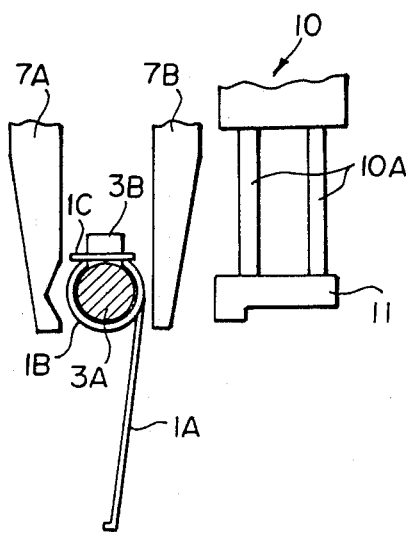

As described above, the push piece 11 is combined with the spring movement means 8 and is moved together with the spring movement means 8. Therefore, the push piece 11 is always located in the vicinity of the claws 7A and 7B. As shown in FIG. 2B, when the claws 7A and 7B have released the coiled portion 1B, the air cylinder 10 is activated, which causes the push piece 11 to move down to the leg portion 1A. The push piece 11 is further moved down, and pushes the leg portion 1A down. As a result, as shown in FIG. 2C, the torsion spring 1 is rotated around the shaft 3A, and the engagement portion 1C is made to engage with the coil engaging protrusion 3B. After the engagement portion 1C is engaged with the coil engaging protrusion 3B, the spring movement means 8 is moved up to the position at which it will grasp the next torsion spring. Also, the air cylinder 10 moves the push piece 11 up to the waiting position shown in FIG. 2A.

Because the pushing force is positively applied to the leg portion 1A as described above, the engagement portion 1C of the torsion spring 1 can quickly and reliably be made to engage with the coil engaging protrusion 3B of the supporting means 3.

Figure 3:
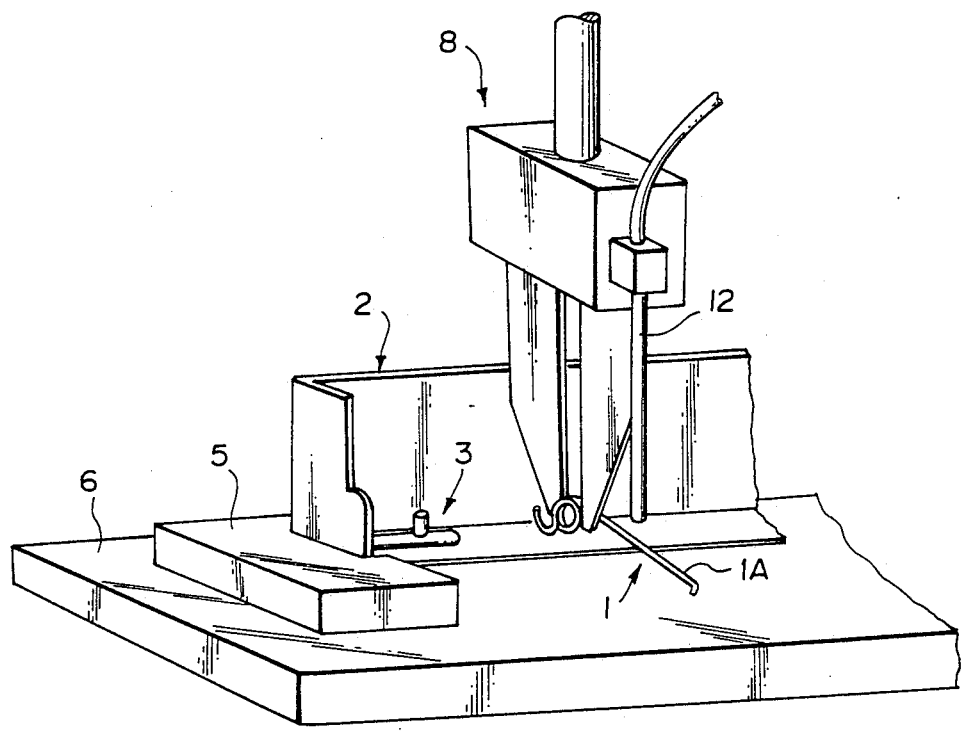

The push means is not limited to the means comprising the air cylinder 10 and the push piece 11. For example, as shown in FIG. 3, an air nozzle 12 secured to the spring movement means 8 may be used as the push means. When the leg portion 1A of the torsion spring 1 is to be moved down, the air nozzle 12 blows air against the leg portion 1A without coming into contact with the leg portion 1A, and causes the leg portion 1A to rotate by means of the air pressure.

In the aforesaid embodiments, the push means need not necessarily be secured to the spring movement means 8. For example, the push means may be secured to a base plate and located in the vicinity of the supporting means 3. The torsion spring mounting apparatus in accordance with the present invention can also be used to mount torsion springs on parts other than guard panels.

We claim:

1. A torsion spring mounting apparatus for mounting a torsion spring on a spring support, said torsion spring comprising a leg portion, a coiled portion one end part of which extends to the leg portion, and an engagement portion which extends to the other end part of the coiled portion and is bent in the tangential direction of the coiled portion, said spring support comprising a cylindrical shaft onto which the coiled portion is to be fitted, and a ccil engaging protrusion embedded in the circumferential surface of the shaft such that the coil engaging protrusion is normal to the shaft, wherein the improvement comprises the provision of:
  (i) a spring movement means which grasps said torsion spring, and fits said coiled portion onto said shaft by moving said torsion spring along said shaft so that said engagement portion does not overlap said coil engaging protrusion, and
  (ii) a push means which pushes said leg portion of said torsion spring, which has been fitted onto said shaft, in order to rotate said torsion spring along the circumferential direction of said shaft and to make said engagement portion engage with said coil engaging protrusion.

2. An apparatus as defined in claim 1 wherein said push means is secured to said spring movement means.

3. An apparatus as defined in claim 1 or 2 wherein said push means is constituted of an air cylinder and a push piece which is secured to a rod of the air cylinder and pushes said leg portion of said torsion spring, which has been fitted onto said shaft.

4. An apparatus as defined in claim 1 or 2 wherein said push means is constituted of an air nozzle which blows air against said leg portion of said torsion spring, which has been fitted onto said shaft, in order to cause said torsion spring to rotate.

* * * * *